United States Patent [19]
Tirro et al.

[11] 3,986,123
[45] Oct. 12, 1976

[54] SYSTEM FOR THE AUTOMATIC CORRECTION OF POLARIZATION DISTORTION IN MULTICHANNEL RADIOCOMMUNICATION STATION

[75] Inventors: Sebastiano Tirró, Rome; Roberto Cafissi; Enzo Cavalieri d'Oro, both of Monza, all of Italy

[73] Assignees: Telespazio S.p.A. per le Comunicazioni Spaziali, Rome; GTE Telecomunicazioni S.p.A.; Societa Italiana Telecomunicazioni Siemens S.p.A., both of Milan, all of Italy

[22] Filed: Sept. 3, 1975

[21] Appl. No.: 610,042

[30] Foreign Application Priority Data
Sept. 3, 1974 Italy ................................ 26884/74

[52] U.S. Cl. ............................... 325/56; 325/60; 325/65; 325/472; 325/473; 343/200
[51] Int. Cl.² ........................................ H04B 7/02
[58] Field of Search ............... 325/3, 8, 42, 45, 47, 325/60, 62, 56, 63, 65, 365, 306, 324, 346, 326, 435, 472–476; 343/200, 100 PE

[56] References Cited
UNITED STATES PATENTS

| | | | |
|---|---|---|---|
| 3,728,644 | 4/1973 | Chu | 333/21 A |
| 3,735,266 | 5/1973 | Amitay | 325/56 X |
| 3,883,872 | 5/1975 | Fletcher et al. | 343/100 PE |
| 3,914,764 | 10/1975 | Ohm | 343/100 PE |

*Primary Examiner*—Robert L. Griffin
*Assistant Examiner*—Aristotelis M. Psitos
*Attorney, Agent, or Firm*—Karl F. Ross; Herbert Dubno

[57] ABSTRACT

A station for the transmission and reception of electromagnetic waves (e.g. from a communication satellite in stationary earth orbit), operating in a multichannel band with two conjugate polarizations, includes a regenerative distortion compensator in a receiving waveguide branch and a predistorter in a transmitting waveguide branch, both controlled by a processor responsive to output signals from a subsequent i-f stage in which a distortion monitor measures cross-talk between the two polarizations on the basis of two central beacons extracted from the incoming message band. The distortion monitor is preceded within the i-f stage by a phase and amplitude stabilizer and is followed by a demodulating stage in which the message signals are distributed to different transmission paths corresponding to the several channels, each transmission path including an individual cancellation-type distortion corrector controlled either by coherent detectors responding to respective channel beacons or by correlators fed with message signals from the two polarizations.

8 Claims, 6 Drawing Figures

SYSTEM FOR THE AUTOMATIC CORRECTION OF POLARIZATION DISTORTION IN MULTICHANNEL RADIOCOMMUNICATION STATION

FIELD OF THE INVENTION

Our present invention relates to a system for the automatic correction of polarization distortion in the transmission of electromagnetic waves, e.g. via communication satellite, in which two conjugate polarizations (either linear or circular) are used to provide a pair of half-channels carrying different messages in a given frequency band.

BACKGROUND OF THE INVENTION

The use of conjugate polarizations (also known as cross-polarizations) for the purpose of doubling the information-carrying capacity of a given band of microwave frequencies is well known, e.g. from U.S. Pat. No. 3,735,266. A linearly polarized wave may be considered as consisting of two orthogonal vectors in phase with each other whereas with circular polarization the two vectors are in quadrature. It is thus possible, by advancing or retarding the relative phase of these vectors, to convert one type of polarization into the other; the conjugacy of two linearly polarized waves, whose planes of polarization stand at right angles to each other, can therefore readily be preserved with circular polarization by using differential phase shifts of +90° and −90° to establish opposite directions of rotation. The term "conjugate", as herein used, applies accordingly both to oppositely rotating circular polarizations and to mutually perpendicular linear polarizations.

When microwave energy with two conjugate polarizations is transmitted in free space, e.g. between ground stations and a satellite, atmospheric disturbances and the nonhomogeneity of the transmission medium tend to create polarization distortions in the form of relative amplitude changes and phase shifts between the associated vectors which result in undesirable cross-talk between the two half-channels. It has already been proposed to utilize a pair of pilot frequencies or beacon signals in these half-channels for deriving therefrom, at the receiving end, information on the existing polarization distortion for the purpose of compensating same. Reference in this connection may be made to an article by T. S. Chu entitled "Restoring the Orthogonality of Two Polarizations in Radio Communication Systems", published in two installments in the Bell System Technical Journal, Vol. 50, No. 9 (pages 3063–3069) and Vol. 52, No. 3 (pages 319–327). That article also teaches the joint use of a differential attenuator or amplifier and a differential phase shifter as corrective devices.

In copending application Ser. No. 603,232 filed Aug. 8, 1975 by one of us, Enzo Cavalieri D'Oro, there has been disclosed a purely electronic system for correcting polarization distortion in a receiver of dual-polarized microwaves as discussed above. That system comprises two differential amplitude changers (attenuators or amplifiers) and two differential phase shifters, one for each polarization, in a waveguide section conducting incoming microwave energy of the dual-polarized type, the two differential amplitude changers being effective in planes including with each other a first acute angle (preferably of 45°) while the two differential phase shifters are effective in planes including with each other a second acute angle (preferably also of 45°). Channel energy with a first and a second polarization, mutually conjugate as hereinabove defined, is extracted from the waveguide section downstream of the differential amplitude changers and phase shifters by a pair of directive couplers, preceded if necessary by a polarization converter which linearizes the incoming microwaves if the same are circularly polarized. One of the directive couplers, assumed by way of example to be vertically oriented, works into a first discriminator which separates a principal component V of a first pilot frequency and a distortion-induced supplemental component $v$ of a second pilot frequency from accompanying message signals; the other coupler, assumed by way of example to be horizontally oriented, coacts with a second discriminator similarly separating a principal component H of the second pilot frequency and a distortion-induced supplemental component $h$ of the first pilot frequency from message signals accompanying same. A processor with input connections from the first and second discriminators and with output connections to the differential amplitude changers and phase shifters obtains from the components V, $v$, H and $h$ four control signals for respectively adjusting the differential amplitude changers and phase shifters to modify the corrective amplitude and phase distortions introduced thereby into the two half-channels, with the effect of minimizing the supplemental components $h$ and $v$.

As further described in the copending application, the same control signals may be fed to similar amplitude changers and phase shifters in a waveguide section for introducing compensatory amplitude and phase distortions in two outgoing half-channels.

The above-described distortion compensator may be characterized as of the regenerative type, in contradistinction to the suppressive type of distortion corrector which operates by canceling out the undesired signal components. Regenerative compensation, carried out at microwave frequency within a receiving waveguide, is effective mainly against distortion which more or less uniformly affects the entire transmission band. This kind of distortion results mainly from the anisotropy of the transmitting medium due to atmospherical and ionospherical phenomena such as rain, air currents and Faraday rotation. There are, however, other factors which exert a nonuniform influence upon different sectors of the frequency band and therefore upon the several message channels into which such a band may be divided. While the technique of regenerative compensation could be applied separately to the individual message channels, such a system would be rather costly and somewhat uneconomical in view of the complexity of the circuits requiring for each channel a pair of differential amplitude changers and a pair of differential phase shifters as described above. On the other hand, the use of suppressive distortion correction in the high-frequency section of a receiver tends to reduce the signal-to-noise ratio to a significant extend and is also rather ineffectual against wide-band distortions due to ambient conditions.

OBJECT OF THE INVENTION

The object of our present invention, therefore, is to provide an improved system for correcting polarization distortion in a multichannel band of microwave frequencies arriving at a local station from a remote post, e.g. at a ground station communicating with an earth-orbiting satellite.

SUMMARY OF THE INVENTION

We realize this object, in accordance with our present invention, by supplementing a regenerative distortion compensator of the above-discussed character, disposed in a receiving waveguide, with distortion-corrective means individual to each message channel connected between two paired transmission paths for suppressing their residual cross-talk components in response to frequency coincidences thereof, the differently polarized message signals of a channel being respectively distributed to this pair of transmission paths upon demodulation. The demodulation takes place after the two polarizations have been divorced from each other by a microwave separator located within the receiving waveguide downstream of the regenerative compensator; that compensator is controlled by output signals from a monitor which is connected across the separator outputs, preferably in an intermediate-frequency stage of the receiver.

More particularly, the distortion-corrective means of a channel may comprise four frequency sensors each with a main input connected to one transmission path and a control input connected to the other transmission path of the associated pair, two of these sensors serving to detect in-phase components while the other two respond to quadrature components. The sensors may be coherent detectors driven by special channel beacons, individual to the respective pair of the transmission paths, which are received with the incoming microwave band and may have been transmitted to a transponder at the remote post (e.g. a satellite) from another ground station communicating with the one here considered. Alternatively, the sensors could be correlators responding to message frequencies in the respective channels, thereby eliminating the need for special channel beacons or pilot frequencies.

BRIEF DESCRIPTION OF THE DRAWING

The above and other features of our invention will now be described in detail with reference to the accompanying drawing in which.

SPECIFIC DESCRIPTION

Figure 1:
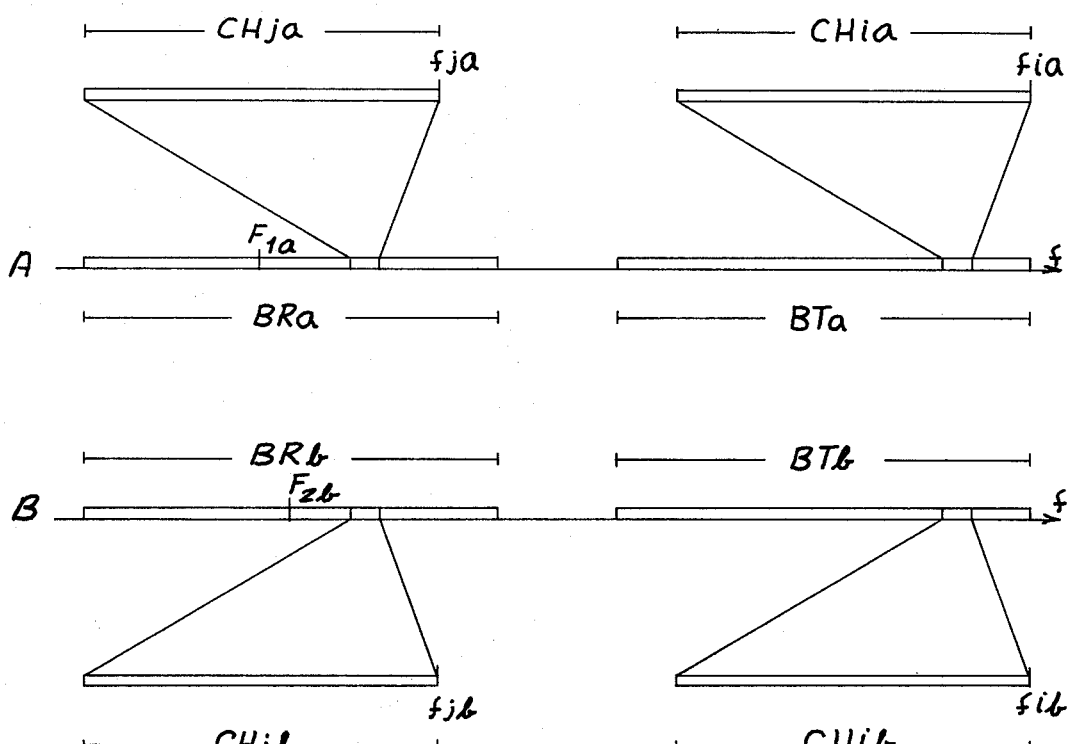
FIG. 1 is a set of graphs illustrating the transmission and reception of a multichannel band of microwave frequencies to which the invention is applicable.

In FIG. 1 we have shown in graphs A and B two conjugate polarizations BRa, BRb of an incoming frequency band received by a ground station from a satellite in stationary earth orbit, the band being subdivided into a multiplicity of message channels each split into a pair of half-channels of one or the other polarization, the two halves of one such channel being shown at CHja, CHjb. Graphs A and B also show two conjugate polarizations BTa, BTb of an outgoing frequency band transmitted toward the satellite, generally from a different ground station, or directed to another satellite from the ground station receiving the band BRa, BRb. The outgoing band is also divided into a multiplicity of channels, the two halves of one such channel being shown at CHia, CHib. Usually transmission and reception take place over different high-frequency carriers, e.g. an outgoing carrier of 6 GHz and an incoming carrier of 4 GHz. If channel CHja, CHjb is a reradiated replica of channel CHia, CHib, then the four half-channels shown in FIG. 1 must obviously occupy the same frequency position in their respective bands.

Two center beacons $F_{1a}$ and $F_{2b}$, both located about midway in the incoming band but differing somewhat in frequency from each other, accompany the two polarizations of graphs A and B; these beacons or pilot frequencies may originate at the satellite transponder but also be part of the reradiated microwave spectrum. Each channel is accompanied by a pair of individual beacons on both its outgoing and its incoming paths, the beacons for the two channel halves CHia/CHja, CHib/CHjb being designated fia/fja, fib/fjb and being located at one end of the associated channel.

For the sake of simplicity, we shall refer hereinafter to the pilot frequencies fja, fjb of the incoming channel beacons even though these frequencies are changed in the subsequent demodulation steps.

Figure 2:
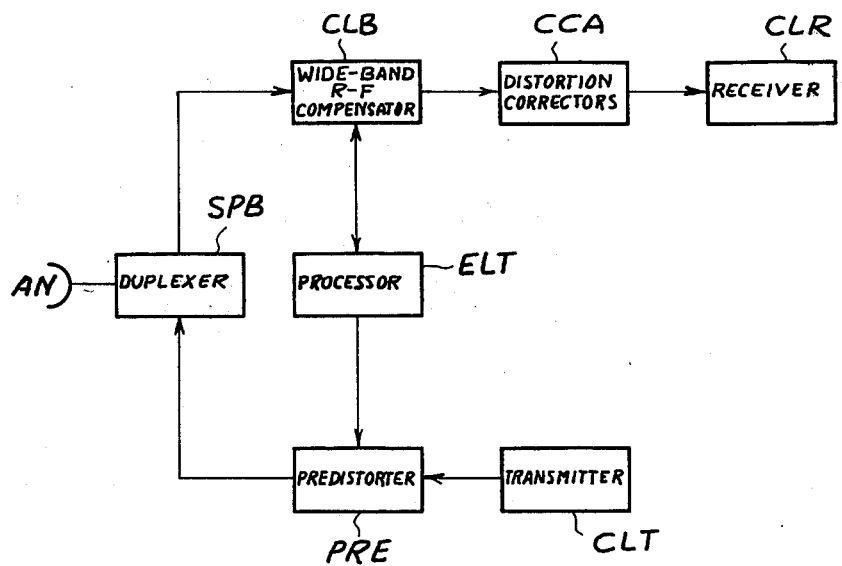
FIG. 2 is an overall block diagram of a ground station embodying our invention.

FIG. 2 shows diagrammatically a ground station adapted to transmit an outgoing band and to receive an incoming band of microwaves as illustrated in FIG. 1. A transmit/receive antenna AN is connected via a two-way coupler or duplexer SPB with a receiving waveguide section and a transmitting waveguide section. The receiving section includes a wide-band radio-frequency compensator CLB in cascade with a set of individual distortion correctors for several channels, forming part of a unit CCA, and a receiver CLR for the message signals of the several half-channels. The transmitting section includes a predistorter PRE to which a transmitter CLT feeds the outgoing message signals destined for the several half-channels. Compensator CLB and predistorter PRE are controlled by a common processor ELT in essentially the manner described in the above-identified copending applicataion and discussed above.

Figure 3:
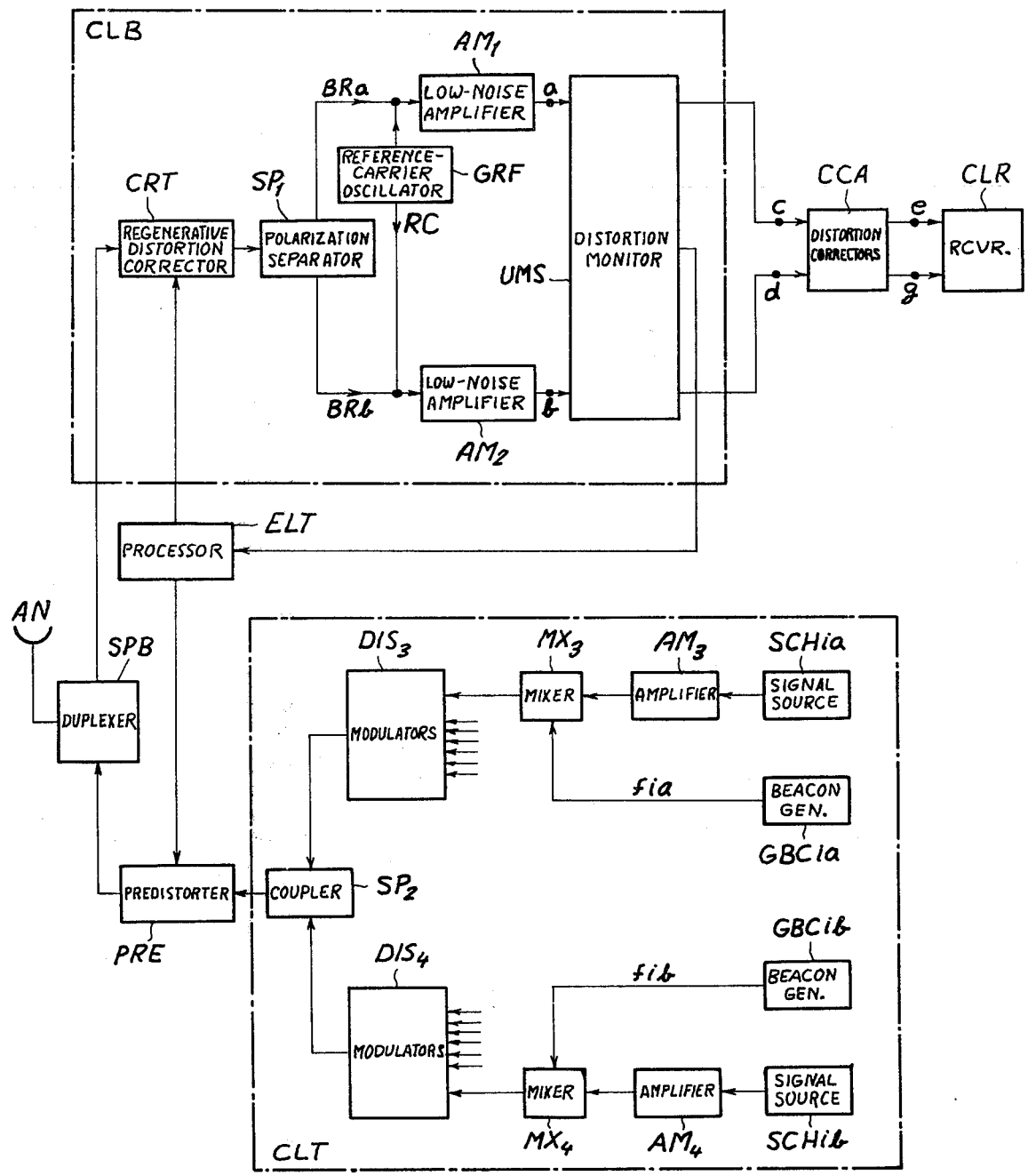
FIG. 3 is a more detailed block diagram of certain components of the station shown in FIG. 2.
Figure 5:
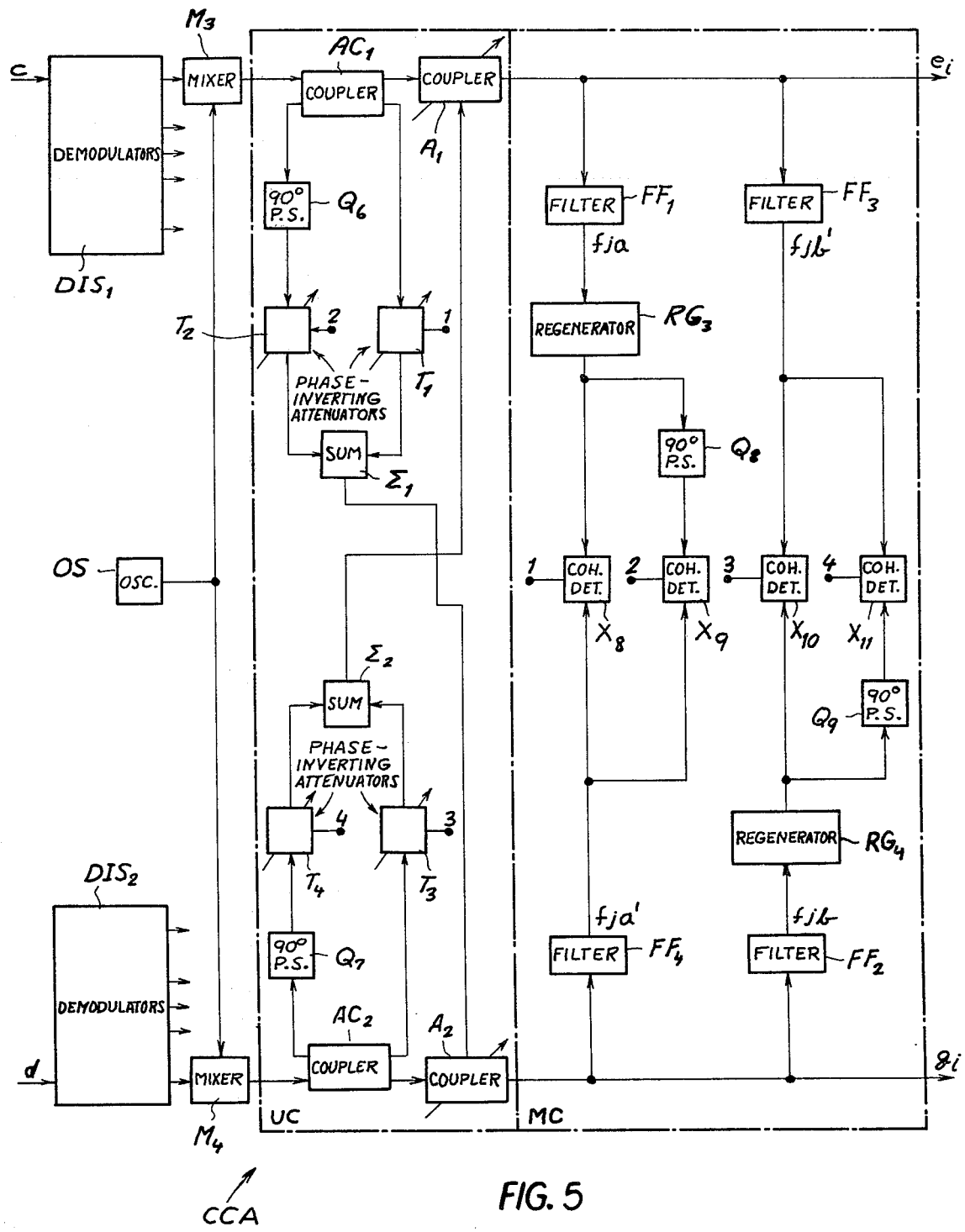
FIG. 5 shows details of another such unit.
Figure 6:
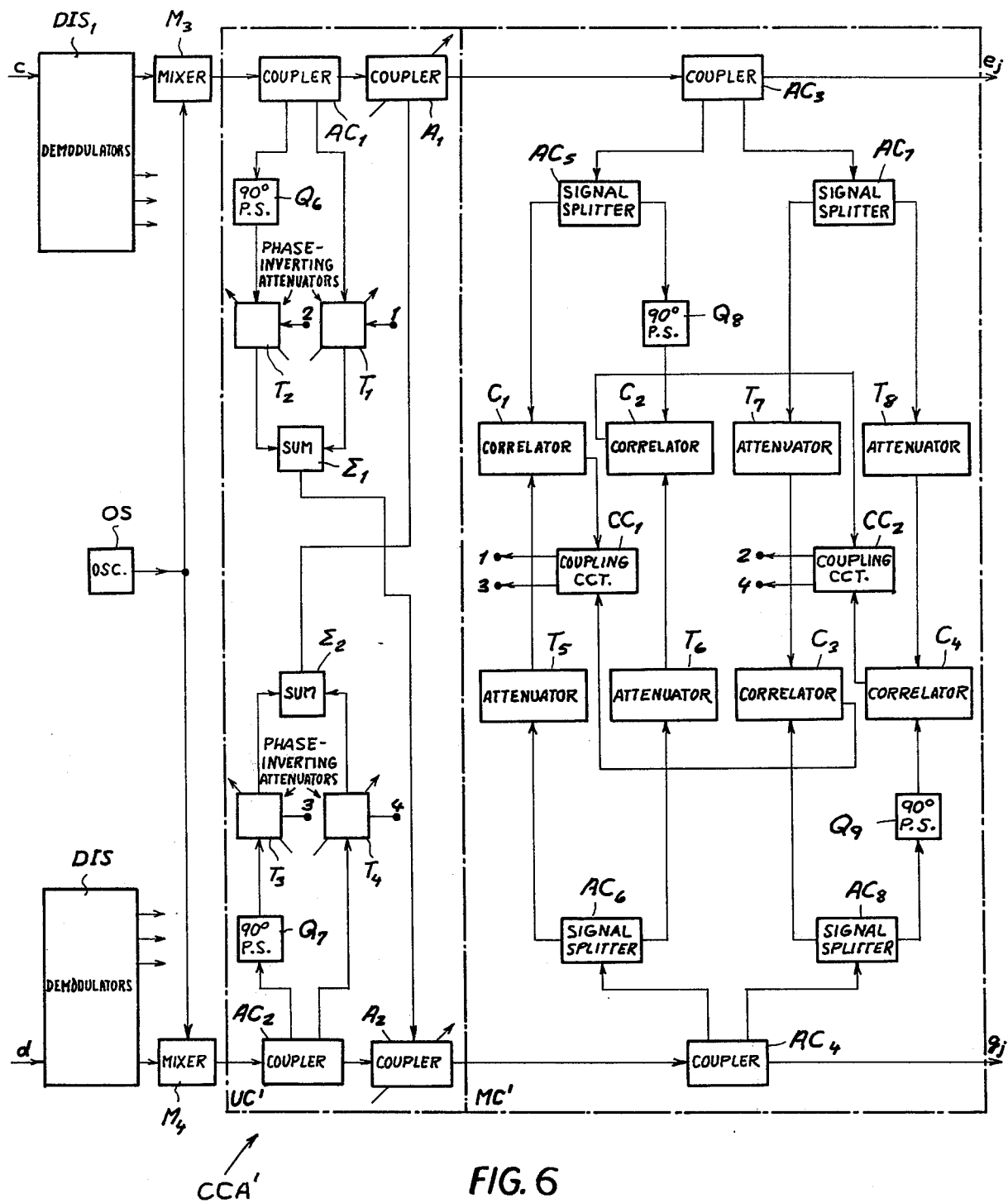
FIG. 6 shows a modification of the unit of FIG. 5.

FIG. 3 shows the components of FIG. 2, with units CLB and CLT illustrated in greater detail. Unit CLB comprises a regenerative distortion corrector CRT advantageously consisting of two differential attenuators and two differential phase shifters, not shown, disposed in cascade within the waveguide. Downstream of distortion corrector CRT the incoming microwave band is split by a polarization separator $SP_1$ into its two components BRa, BRb shown in FIG. 1. A local oscillator GRF introduces a reference carrier RC of predetermined frequency into the two waveguide branches upstream of a pair of low-noise amplifiers $AM_1$ and $AM_2$ having respective output terminals a and b. These terminals are the inputs of a distortion monitor UMS, more fully described hereinafter with reference to FIG. 4, whose output controls the processor ELT and from which the incoming signals, now stepped down to an intermediate-frequency range, are delivered to inputs c and d of corrective unit CCA. Within this unit, as described hereinafter with reference to FIGS. 5 and 6, the i-f signals are further demodulated by heterodyning with the subcarriers of the respective channels so as to reach input terminals e, g of receiver CLR in a low-frequency (e.g. audio) range. Each terminal e, g, is representative of a multiplicity of such terminals, one for each half-channel, as shown in FIGS. 5 and 6 at $e_j$ and $g_j$ for the channel CHja, CHjb of FIG. 1.

As further seen in FIG. 3, transmitter CLT comprises a pair of signal sources SCHia, SCHib, forming part of two groups, whose outputs are to be transmitted via respective half-channels $CH_{ia}$, $CH_{ib}$ (FIG. 1) to a remote post such as a communication satellite. Signal sources SCHia, SCHib work via respective amplifiers $AM_3$, $AM_4$ into a pair of mixers $MX_3$, $MX_4$ which also receive the outgoing channel beacons fia and fib from corresponding generators GBCia and GBCib. Two modulators $DIS_3$, $DIS_4$ elevate the channel frequencies of the two groups into the microwave range, each of these demodulators feeding a respective waveguide section in which these signals are propagated with conjugate polarizations to a coupler $SP_2$ for delivery by way of predistorter PRE to duplexer SPB and thence to antenna AN.

Figure 4:
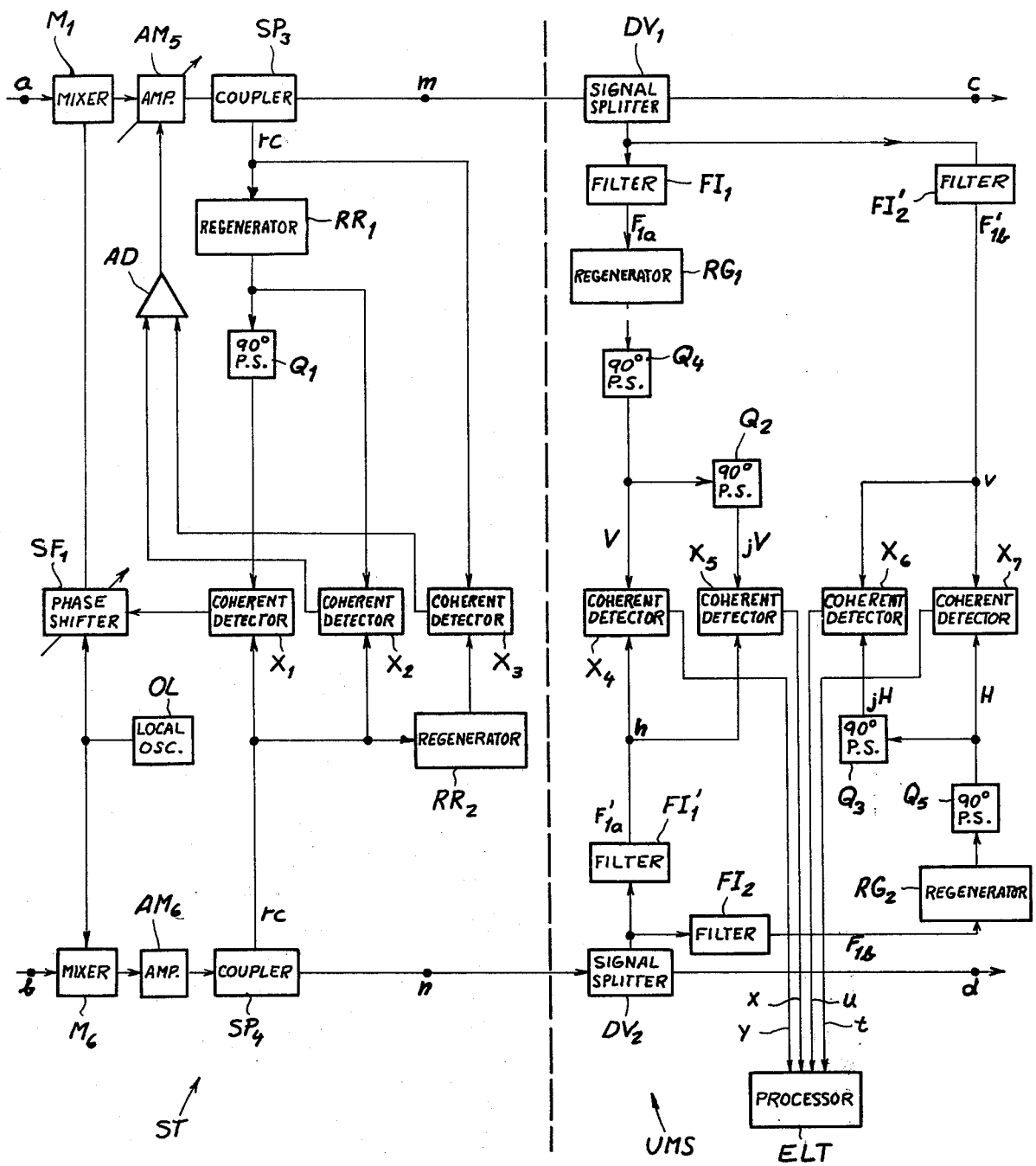
FIG. 4 shows further details of a unit included in one of the components of FIG. 3.

The distortion monitor UMS is shown in FIG. 4 as being preceded by a stabilizer ST designed to correct relative amplitude and phase deviations experienced by the signals passing over transmission paths $a-c$ and $b-d$ upon being stepped down to the intermediate-frequency range. This frequency stepdown is accomplished by a pair of mixers $M_1$ and $M_2$ to which an i-c carrier is supplied by a local oscillator OL; a variable phase shifter $SF_1$ is inserted between oscillator OL and mixer $M_1$. An adjustable amplifier $AM_5$ in the output of mixer $M_1$ is controlled by a differential amplifier AD; a similar amplifier $AM_6$, of fixed gain, is connected in the output of mixer $M_2$. Amplifiers $AM_5$ and $AM_6$ feed respective couplers $SP_3$ and $SP_4$ which extract the local carrier from oscillator GRF of FIG. 3 (stepped down to a frequency $rc$ along with the message signals) and feed it to three coherent detectors $X_1$, $X_2$ and $X_3$. Detector $X_1$, which controls the phase shifter $SF_1$, has a main input connected via coupler $SP_4$ to transmission path $b-d$ and a control input connected to transmission path $a-c$ via coupler $SP_3$ in cascade with a regenerator $RR_1$ and a 90° phase shifter $Q_1$. Regenerator $RR_1$ includes an adjustable oscillator of operating frequency $rc$ which is phase-locked in conventional manner to the extracted carrier frequency. With a quadrature relationship introduced by phase shifter $Q_1$, the regenerated carrier frequency unblocks the detector $X_1$ at every other zero crossing; the carrier from coupler $SP_4$ should normally pass through zero at the instants of unblocking so that a positive or negative output of detector $X_1$ is indicative of a relative phase displacement and causes a corrective adjustment of phase shifter $SF_1$.

Detectors $X_2$ and $X_3$ operate in an analogous manner to equalize the amplitude changes which have occurred in demodulation. Detector $X_2$ has its main input connected to coupler $SP_4$ and its control input to regenerator $RR_1$ whereas detector $X_3$ has its main input connected to coupler $SP_3$ and its control input to a similar regenerator $RR_2$ receiving the output of coupler $SP_4$. Differential amplifier AD, responding to the outputs of detectors $X_2$ and $X_3$, carries out a corrective gain adjustment of amplifier $AM_5$. The signals thus stabilized appear on a pair of intermediate terminals $m$ and $n$ in the output circuit of distortion monitor UMS.

The distortion monitor comprises four additional coherent detectors $X_4$, $X_5$, $X_6$ and $X_7$, each similar to the detectors described above, as well as a pair of signal splitters $DV_1$ and $DV_2$ in transmission paths $a-c$ and $b-d$. Signal splitter $DV_1$ feeds a pair of filters $FI_1$ and $FI'_2$ in parallel, the former extracting the central beacon $F_{1a}$ for delivery to the control input of detector $X_4$ via a regenerator $RG_1$ and a 90° phase shifter $Q_4$ whereas the latter passes a distortion-induced component $F'_{1b}$ to the main inputs of detectors $X_6$ and $X_7$. The output of phase shifter $Q_4$ is also delivered to a control input of detector $X_5$ via another 90° phase shifter $Q_2$. The main inputs of detectors $X_4$ and $X_5$ receive a distortion-induced component $F'_{1a}$ from filter $FI'_1$ whereas the control inputs of detectors $X_6$ and $X_7$ receive the beacon $F_{1b}$ from filter $FI_2$ via a regenerator $RG_2$, a 90° phase shifter $Q_5$ and, in the case of detector $X_6$, another 90° phase shifter $Q_3$. The control signals for detectors $X_4$, $X_5$, $X_6$ and $X_7$ have been designated $V$, $jV$, $jH$ and $H$, respectively, in conformity with the signal identifications used in the copending application referred to above; correspondingly, the cross-talk components to be detected by units $X_4$, $X_5$ and $X_6$, $X_7$ have been labeled $h$ and $v$, respectively. The several outputs of the four detectors bear respective designations $y$, $x$, $u$ and $t$, again in conformity with the disclosure of the prior application.

As shown in FIG. 5, the i-f signals having arriving at terminals $c$ and $d$ are further demodulated at $DIS_1$, $DIS_2$ for distribution to different pairs of transmission paths assigned to their respective channels, here specifically the paths terminating at inputs $e_j$ and $g_j$ of receiver CLR (FIG. 2). These transmission paths include a pair of mixers $M_3$ and $M_4$ supplied with the corresponding subcarrier from a local oscillator OS. The part of corrective unit CCA serving the channel CHja, CHjb is seen to comprise a suppressor section UC and a testing section MC. Section UC includes a coupler $AC_1$ in path $c-e_j$ delivering the channel beacon fja directly and via a 90° phase shifter $Q_6$ to respective attenuators $T_1$ and $T_2$, these attenuators inverting the phase of their output signals in response to a change in sign of a signal applied to respective control inputs 1 and 2 thereof. Analogously, a coupler $AC_2$ in path $d-g_j$ delivers the channel beacon fjb directly and via a 90° phase shifter $Q_7$ to a pair of inverting attenuators $T_3$, $T_4$, respectively, whose control inputs have been designated 3 and 4. The outputs of attenuators $T_1$ and $T_2$, combined in a summing circuit $\Sigma_1$, control the gain of a variable amplifier $A_2$ in cascade with coupler $AC_2$; similarly, the inputs of attenuators $T_3$ and $T_4$ are combined in a summing circuit $\Sigma_2$ to control the gain of a variable amplifier $A_1$ in cascade with coupler $AC_1$.

Testing section MC comprises filters $FF_1$ and $FF_3$, isolating the channel beacon fja and a distortion-induced component fjb' of channel beacon fjb from the upper transmission path $c-e_j$, as well as filters $FF_2$ and $FF_4$, extracting the channel beacon fjb and a distortion-induced component fja' of beacon fja from the lower path $d-g_j$. Beacon fja is fed through a regenerator $RG_3$ to a control input of a coherent detector $X_8$ and in parallel therewith, by way of a 90° phase shifter $Q_8$, to a control input of another such detector $X_9$; similarly, beacon fjb passes through a regenerator $RG_4$ to a control input of a coherent detector $X_{10}$ and in parallel therewith, via a 90° phase shifter $Q_9$, to a control input of a fourth detector $X_{11}$. Detectors $X_8-X_{11}$ work into the control inputs 1–4 of attenuators $T_1-T_4$ to vary the gain of amplifiers $A_1$ and $A_2$ in a sense tending to suppress the spurious components fjb' and fja', respectively.

A similar unit CCA', shown in FIG. 6, has the same suppressor section UC' followed by a modified testing section MC'. In this instance no channel beacons are present in the incoming signals. Message frequencies are extracted from the upper path via a coupler $AC_3$ and delivered by way of signal splitters $AC_5$ and $AC_7$ to two correlators $C_1$ and $C_2$ as well as two attenuators $T_7$ and $T_8$, phase shifter $Q_8$ being inserted between splitter $AC_5$ and correlator $C_2$. Analogously, a coupler $AC_4$ extracts corresponding message frequencies from the lower path and delivers them via signal splitters $AC_6$ and $AC_8$ to two attenuators $T_5$ and $T_6$ as well as two correlators $C_3$ and $C_4$, the latter by way of phase shifter $Q_9$. The correlators, on detecting frequency in-phase and phase-quadrature coincidences in the two signal paths, supply corrective signals to the control inputs 1, 3 of attenuators $T_1$, $T_3$ by way of a coupling circuit $CC_1$ and to the control inputs 2, 4 of attenuators $T_2$ and $T_4$ by way of another such circuit $CC_2$.

We claim:

1. A system for correcting polarization distortions in microwaves arriving from a remote post at a local station, said microwaves having a frequency band divided into a multiplicity of channels with two conjugate polarizations including a pair of central beacons respectively sent out with said polarizations by the remote post, comprising:
   waveguide means for conducting a multichannel band of incoming microwaves with said two polarizations accompanied by said central beacons;
   regenerative compensation means in said waveguide means for introducing corrective amplitude and phase distortions into the incoming band;
   separator means downstream of said compensation means for divorcing said polarizations from each other;
   monitoring means connected to said separating means for extracting said central beacons from said polarizations and deriving therefrom a set of output signals for the control of said compensation means;
   demodulating means connected to said separator means for distributing incoming message signals from different channels of said band to respective pairs of transmission paths, each transmission path of a pair receiving signals arriving with a respective polarization; and
   individual distortion-corrective means for each channel connected between the transmission paths of each pair for suppressing residual cross-talk components thereof in response to frequency coincidences between the paired transmission paths.

2. A system as defined in claim 1, further comprising frequency-changing means downstream of said separator means for stepping down said band to an intermediate-frequency range, said monitoring means being connected between two branches of an output circuit of said frequency-changing means respectively carrying the signals of said two polarizations.

3. A system as defined in claim 2, further comprising phase-stabilizing and amplitude-stabilizing means connected across said branches upstream of said monitoring means for equalizing phase and amplitude deviations between said branches introduced by said frequency-changing means.

4. A system as defined in claim 3, further comprising a local oscillator connected to said waveguide means between said separator means and said frequency-changing means for supplementing the message signals of said branches with a common carrier wave selectively passed to said phase-stabilizing and amplitude-stabilizing means.

5. A system as defined in claim 1 wherein said waveguide means is part of a transceiver including a transmitting waveguide for radiating outgoing microwaves to said remote post, further comprising predistorting means in said transmitting waveguide connected to said monitoring means for control by said output signals.

6. A system as defined in claim 1 wherein said distortion-corrective means comprises a first frequency sensor with a main input connected to one transmission path of a pair and a control input connected to the other transmission path of the pair for in-phase energization by corresponding frequencies, a second frequency sensor with a main input connected to said one transmission path and a control input connected to said other transmission path for quadrature energization by corresponding frequencies, a third frequency sensor with a main input connected to said other transmission path and a control input connected to said one transmission path for in-phase energization by corresponding frequencies, and a fourth frequency sensor with a main input connected to said other transmission path and a control input connected to said one transmission path for quadrature energization by corresponding frequencies.

7. A system as defined in claim 6 wherein said frequency sensors are coherent detectors responsive to a channel beacon individual to the respective pair of transmission paths.

8. A system as defined in claim 6 wherein said frequency sensors are correlators responsive to message signals passing over the respective pair of transmission paths.

* * * * *